United States Patent
Miranda et al.

(10) Patent No.: US 11,907,392 B2
(45) Date of Patent: Feb. 20, 2024

(54) SYSTEM AND METHOD UTILIZING FUNCTION SECRET SHARING WITH CONDITIONAL DISCLOSURE OF SECRETS

(71) Applicant: Seagate Technology LLC, Fremont, CA (US)

(72) Inventors: Nolan Miranda, Winston-Salem, NC (US); Vipin Singh Sehrawat, Singapore (SG); Foo Yee Yeo, Singapore (SG)

(73) Assignee: Seagate Technology LLC, Fremont, CA (US)

( * ) Notice: Subject to any disclaimer, the term of this patent is extended or adjusted under 35 U.S.C. 154(b) by 464 days.

(21) Appl. No.: 17/318,045

(22) Filed: May 12, 2021

(65) Prior Publication Data

US 2022/0374539 A1 Nov. 24, 2022

(51) Int. Cl.
G06F 21/62 (2013.01)
G06F 21/55 (2013.01)
G06F 16/248 (2019.01)
G06F 16/28 (2019.01)
G06F 16/242 (2019.01)

(52) U.S. Cl.
CPC ........ *G06F 21/6227* (2013.01); *G06F 16/248* (2019.01); *G06F 16/2448* (2019.01); *G06F 16/284* (2019.01); *G06F 21/556* (2013.01)

(58) Field of Classification Search
CPC ............. G06F 21/6227; G06F 16/2448; G06F 16/284; G06F 16/248; G06F 21/556
See application file for complete search history.

(56) References Cited

U.S. PATENT DOCUMENTS

| | | | |
|---|---|---|---|
| 9,224,007 B2 | 12/2015 | Fox et al. | |
| 9,734,169 B2 | 8/2017 | Redlich et al. | |
| 10,390,220 B2 | 8/2019 | Joy | |
| 10,505,723 B1 | 12/2019 | Griffin et al. | |
| 11,115,196 B1 * | 9/2021 | Triandopoulos | H04L 63/083 |
| 2010/0031128 A1 * | 2/2010 | Obana | H04L 9/085 |
| | | | 714/784 |

(Continued)

OTHER PUBLICATIONS

Boyle et al., "Secure Computation with Preprocessing via Function Secret Sharing", Theory of Cryptography Conference, Nov. 22, 2019, pp. 341-371.

(Continued)

*Primary Examiner* — Techane Gergiso
(74) *Attorney, Agent, or Firm* — Mueting Raasch Group (57) ABSTRACT

A function is decomposed into a plurality of function shares. The function returns a Boolean result based on whether an input y satisfies a query on a data set. The function shares hide the function from non-collaborating entities that separately execute the function shares. Each of the functions shares are sent to one of a plurality of servers having a same data set. The function shares are executed on the data set at the servers to obtain a respective plurality of shares. A conditional disclosure of secrets operation is simulated on the shares and the input y. The conditional disclosure of secrets operation uses a secret known to at least one of the servers, and further uses a source of randomness shared between the servers. A Boolean value corresponding to the Boolean result is returned based on the conditional disclosure of secrets operation returning the secret.

20 Claims, 6 Drawing Sheets

(56) References Cited

U.S. PATENT DOCUMENTS

| | | | | |
|---|---|---|---|---|
| 2014/0173270 A1* | 6/2014 | Matsuo | ............... | H04L 63/0428 |
| | | | | 713/150 |
| 2017/0149796 A1* | 5/2017 | Gvili | ................... | H04L 63/0428 |
| 2018/0039792 A1* | 2/2018 | Ohara | ................. | G06F 21/6227 |
| 2020/0007514 A1* | 1/2020 | Li | ........................ | G06F 21/602 |
| 2021/0135850 A1* | 5/2021 | Hoang | .................. | H04L 9/085 |
| 2022/0376902 A1* | 11/2022 | Sajjad | ..................... | G06F 21/62 |
| 2023/0274183 A1* | 8/2023 | Mauser | ............... | G06F 21/6245 |
| | | | | 706/12 |

OTHER PUBLICATIONS

Boyle et al., "Function Secret Sharing", Annual International Conference on the Theory and Applications of Cryptographic Techniques—Eurocrypt 2015, 2015, pp. 337-367.

Boyle et al., "Function Secret Sharing: Improvements and Extensions", Proceedings of the 2016 ACM SIGSAC Conference on Computer and Communications Security, Oct. 2016, pp. 1292-1303.

Getner et al., "Protecting Data Privacy in Private Information Retrieval Schemes", Journal of Computer and System Sciences, vol. 60, Issue 3, Jun. 2000, pp. 592-629.

\* cited by examiner

SYSTEM AND METHOD UTILIZING FUNCTION SECRET SHARING WITH CONDITIONAL DISCLOSURE OF SECRETS

SUMMARY

The present disclosure is directed to a system and method utilizing functional secret sharing with conditional disclosure of secrets. In one embodiment, a method involves receiving, from a requestor at a server selected from a plurality of servers having a same data set, a function share that belongs to a plurality of function shares decomposed from a function. The plurality of function shares are separately distributed by the requestor to the plurality of servers. The function returns a Boolean result based on whether an input y satisfies a query on the data set. The function shares hide the function from non-collaborating entities that separately execute the function shares. The function shares are executed on the data set to obtain a share. Others of the plurality of servers obtain other shares based on executing the other function shares. With the other servers, a conditional disclosure of secrets operation is simulated on the shares and the input y. The conditional disclosure of secrets operation uses a secret known to at least one of the plurality of servers, and further uses a source of randomness shared between the plurality of servers. A Boolean value is returned to the requestor corresponding to the Boolean result based on the conditional disclosure of secrets operation returning the secret.

In another embodiment, a method involves decomposing a function share into a plurality of function shares. The function returns a Boolean result based on whether an input y satisfies a query on a data set. The function shares hide the function from non-collaborating entities that separately execute the function shares. Each of the functions shares are sent to a respective one of a plurality of servers having a same data set. The function shares are executed on the data set at the plurality of servers to obtain a respective plurality of shares. A conditional disclosure of secrets operation is simulated on the shares and the input y. The conditional disclosure of secrets operation uses a secret known to at least one of the plurality of servers, and further uses a source of randomness shared between the plurality of servers. A Boolean value corresponding to the Boolean result is returned based on the conditional disclosure of secrets operation returning the secret.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to privacy in computational systems. This may include operations where an agent (e.g., person, program) interacting with a computer system (e.g., via a network) wishes to keep its activity private. This privacy may include hiding what actions (e.g., queries) were taken as well as data sent and received as part of the actions. In the following disclosure, data privacy is used as an illustrative example to which the systems and methods described can be used. It will be understood that the described embodiments may be used in other applications besides data privacy, and the examples provided are not meant to be limiting.

In the modern, Internet-connected era, people have access to large amounts of remotely stored data, both public and private. The data itself is quite valuable, due to its immense size and easy accessibility via networks and computer programs. Just as valuable in some scenarios is the identity of the people that are accessing the data and the specific data they are looking at. This can be for benign uses (e.g., trying to improve service based on usage patterns), malign uses (e.g., spying on individuals), or somewhere in between (e.g., direct marketing).

Because of the ubiquity of interconnectedness in modern society, the concept of privacy has become an important issue. Generally, users would like to have access to publicly available data without their specific queries being recorded and/or traced back to them, or even to have the content of such queries be revealed. While such techniques as anonymization of network traffic (e.g., Tor networks) are useful in some contexts in keeping the user's identity secret, in other contexts, users may desire to have their specific queries be kept secret even to the data source which they are querying. This latter case is the subject of what is referred to as private information retrieval (PIR), which allows a user to retrieve information from a database while maintaining the query private. This can have benefits whether or not the user's identity is known.

Database providers may also want to limit data that is leaked to users. For example, a database provider which charges based on the amount of information returned from a query may wish to limit the user from deriving other data for which the user has not paid. These concepts can be extended to other scenarios than database access, such as secure messaging, zero-knowledge protocols, attribute-based encryption, etc.

In embodiments described below, a function secret sharing (FSS) scheme is described. An FSS scheme involves determining a function that obtains data from a remote data set such as a relational database. The function f is decomposed into two or more function shares that are sent to respective two or more different servers. The function shares are a family of functions that the servers can execute, but do not reveal what data was queried by the function shares. In other words, the function shares do not reveal the function f, but the results of the all of function shares' operations can be combined by the requestor to recover the result of the function f. So long as at least one of the servers does not collude with the rest of the servers, the function f is hidden from all of the servers.

The use of FSS is useful in a number of situations. Consider a scenario wherein data storage is outsourced to multiple third party servers. If the data owner wishes to compute some function f on the data without revealing f, then techniques like homomorphic encryption and multi-party computation (MPC) are inapplicable because these methods require the function to be known to at least one of the servers. Having the capability to employ the servers to evaluate a private function f without any server knowing f itself has a number of direct applications, including: searching over encrypted data without requiring any decryption; retrieving data from servers without revealing what was retrieved; privately extracting sensitive information from a pool of seemingly innocuous data, etc.

A PIR model such as FSS is concerned with user-privacy, without requiring any protection of data-privacy. For example, some PIR implementations may allow the user to obtain other physical bits of the data or other information such as the exclusive-OR of certain subsets of the bits of the data. Therefore, embodiments described herein utilize a method known as conditional disclosure of secrets (CDS) in combination with FSS in order to prevent leakage of data to the user.

One possible application for the schemes described below is to offer cloud storage services where parties can perform private evaluation of functions. A customer might want to compute on some data that is stored on the cloud database, but that function or algorithm might provide access to sensitive information. For example, the sensitive information could be a trade secret of the customer or it could be a proprietary algorithm such as stock price predictor. By using function secret sharing, such a computation can be done on the cloud while preserving the customer's desire to keep their function secret.

Another possible application for these schemes is to perform efficient searches over encrypted data. The naive approach to search over encrypted data is "first decrypt, then search." But the naive approach may be inefficient since decrypting an entire database for simple search may be overkill. Function secret sharing can be used to perform searches over encrypted data without requiring any decryption.

Figure 1:
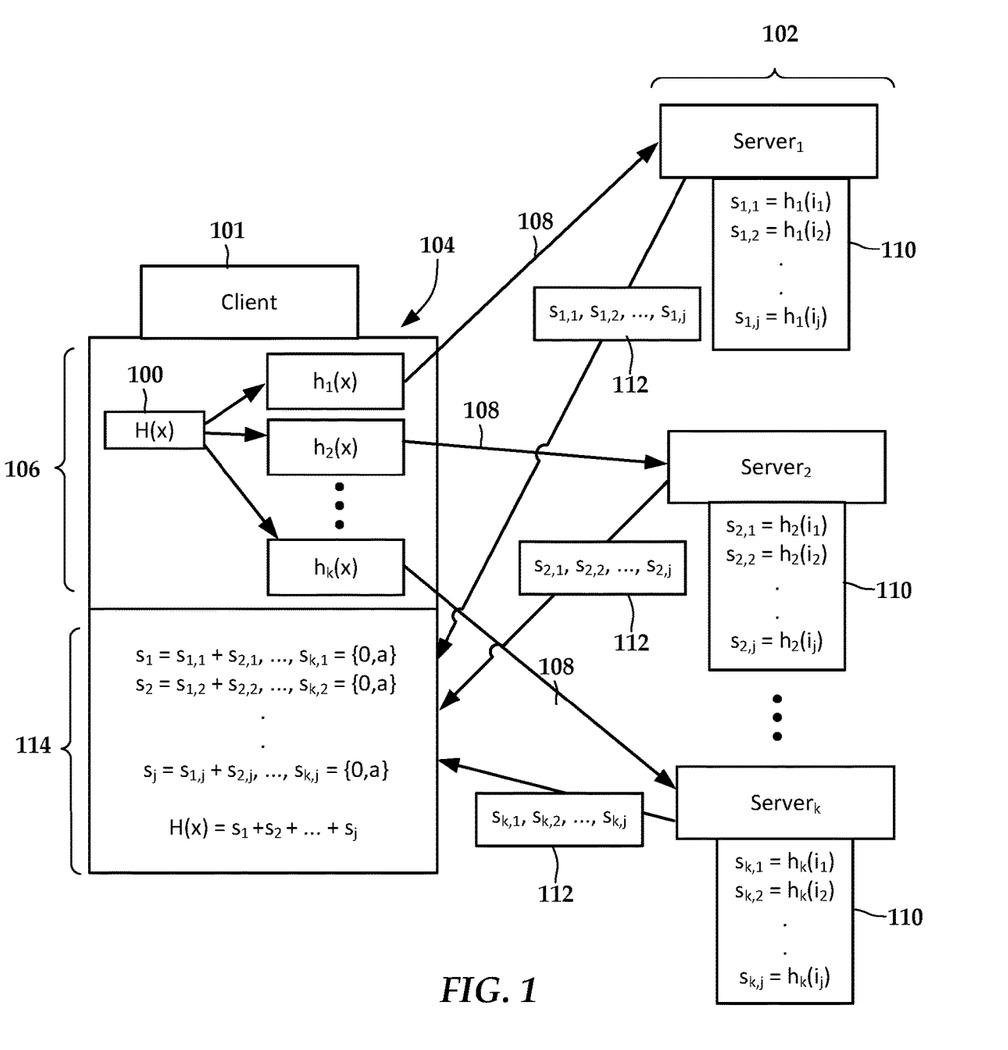
FIGS. 1 is a block diagram of a file secret sharing system according to an example embodiment.

In FIG. 1, a block diagram shows details of an FSS scheme according to an example embodiment. This example relates to a client 101 that wishes to retrieve data from servers 102 without the servers knowing exactly what data was retrieved. For purposes of this example, it is assumed that each server 102 has an identical copy of the data of interest, and that the servers 102 do not collude with each other, e.g., do not share the functions and/or results of the functions executed by the client 101. So long as at least one server 102 is honest (e.g., doesn't collude with the others), the client 101 can ensure that the queries are kept private through FSS. Function secret sharing has found applications in secure computation and private information retrieval. Note that the terms, client, server, intermediary, etc., are used for illustration and not limitation. For example, hardware such as mobile devices, edge computing nodes, Internet-of-things device, etc., may serve in any combination of these roles, as well as traditional client/server hardware such as personal computers, cloud computer systems, etc.

Function secret sharing aims to share a function H 100 among two or more parties (servers 102 in this example) so that the parties can jointly evaluate the function H 100 without revealing it. Let k be the number of parties, Server$_1$ to Server$_k$ in this example. Function secret sharing is achieved by decomposing H 100 into functions A 104 (for i=1, ..., k), such that for any input x, $$H(x) = \sum_{i=1}^{k} h_i(x).$$

For purposes of this disclosures, the plurality of functions h$_i$ 104 will be referred to as "function shares" so as to avoid confusion with function or family of functions H. The function shares 104 are distributed to the parties 102 such that, given any input x: (i) each function share h$_i$ can be used to compute a resulting share s$_i$ that depends on the input x, (ii) the shares s$_1$, ..., s$_k$ can be combined to obtain the output H(x).

In the example illustrated in FIG. 1, the functions h$_i$ are distributed point functions. These functions evaluate to a value a on an input x, and zero otherwise. While other functions can be used, distributed point functions offer low computation complexity and can be linearly combined to determine the result of the function H( ). As seen in FIG. 1, the client 101 has decomposed 106 function H(x) 100 into the function shares h$_i$(x) 104. Note that some other entity than the client 101 may perform this decomposition 106, and the client 101 need not have knowledge of the form of the function shares h$_i$(x) 104. Generally, the client only needs to know x and how to combine the shares returned by execution of function shares h$_i$(x) 104 by the server.

As indicated by paths 108, the client 101 sends queries to the servers 102. The queries 108 may inherently or expressly describe the function shares h$_i$(x) 104. For this example, the value of x will be assumed to be an index of data stored within the servers 102, but could include any data that the client 101 wishes to hide from the servers 102 that may be the subject of the queries 108. In response to the queries 108, the servers 102 will execute the respective function shares h$_i$(x) 104 on their individual, identical data sets. In this example, it is assumed the servers 102 execute 110 respective function shares h$_i$(x) 104 on every index i within the data sets, such as on every row within a database table. There are j total indices in this example.

The result of the function executions 110 includes one or more shares 112 sent from each server 102 to the client 101. Each set of shares 112 is combined 114 by the client 101 to determine shares s$_i$, which each represent the combination of the results of the execution of the function shares h$_i$(x) 104 for each index of the databases. For every one of the indices i, the ith share s$_i$ will be either a or 0. For example, if the function shares h$_i$(x) 104 are configured such that a=1, then the total of all s$_j$ shares will indicate the total number of entries in the database that have that index.

Figure 2:
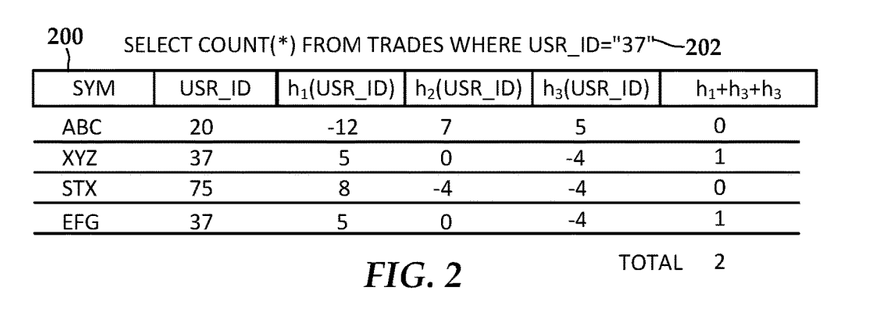
FIG. 2 is a table showings an application of file secret sharing system according to an example embodiment.

In FIG. 2, a table 200 shows a transaction that may occur using function secret sharing according to an example embodiment. In this example, a relational database table stores data on stock trades, with the first column indicating stock symbols of the trades and with the second column indicating an identifier of a user who made the trades. A query 202 is shown above the table, in which a count of trades with USR_ID=37 is desired. This query 202 is analogous to the function H(x) in FIG. 1. The requestor making the query wishes to hide which identifier is the subject of the query, and so forms three function shares h$_1$, h$_2$, and h$_3$, which are sent to three different parties (e.g., servers) for execution. The results of these function shares (the shares s$_i$) as executed by each party are shown in the third through fifth columns of the table 200. These results, by themselves, will not tell the servers anything about which data is the subject of the query. As seen in the last column, however, the requestor can recover the requested data by summing the individual shares from each entity.

Note for the example in FIG. 2, the parties are executing the function shares $h_1$, $h_2$, and $h_3$ on data that is the target of the query, and in some embodiments, might also execute these function shares on data that is not the target of the query. This hides the intentions of the requestor, but leaves the possibility that carefully crafted function shares could reveal data other than what is the subject of the query. In order to keep from leaking data to a requestor or other party (e.g., an intermediary), systems described herein utilize a concept known as conditional disclosure of secrets.

The scheme for conditional disclosure of a (common) secret (CDS) for a fixed Boolean condition function $h(y)$: $\{0, 1\}^n \to \{0, 1\}$ involves: (i) k players $P_1, \ldots, P_k$; (ii) a shared random input r; and (iii) a secret s. The function $h(y)$ is also sometimes referred to as the predicate function. Note that the secret s may be known to all of the players or a subset thereof. There is an external party known as Carol to whom the players want to reveal the secret s provided $h(y)=1$. In this scenario, an input $y \in \{0, 1\}^n$ (i.e., y is an n-bit string) is known to Carol. The input y is divided up into $y_1, \ldots, y_k$ parts each associated with one of the players. Each player $P_j$ sends some message $m_j$ to Carol, where $m_j$ is computed using their portion of the input $y_k$, the shared randomness r, and the secret s. It is also possible that not all of the players have the secret, in which case $m_j$ do not depend on s for all players who don't know s.

This scheme has two requirements. The first requirement is correctness, requires that if $h(y)=1$, then Carol always reconstructs s from the messages $m_1, \ldots, M_k$ and the input y (for all choices of r and s). The second requirement is secrecy, which can be stated informally as: if $h(y)=0$, then Carol does not learn any information about the secret s. Note that the CDS scheme only requires a single message sent from the players to Carol, and the players do communicate with each other, except for knowing the shared randomness r and the secret s. The shared randomness r is kept secret from Carol.

Figure 3:
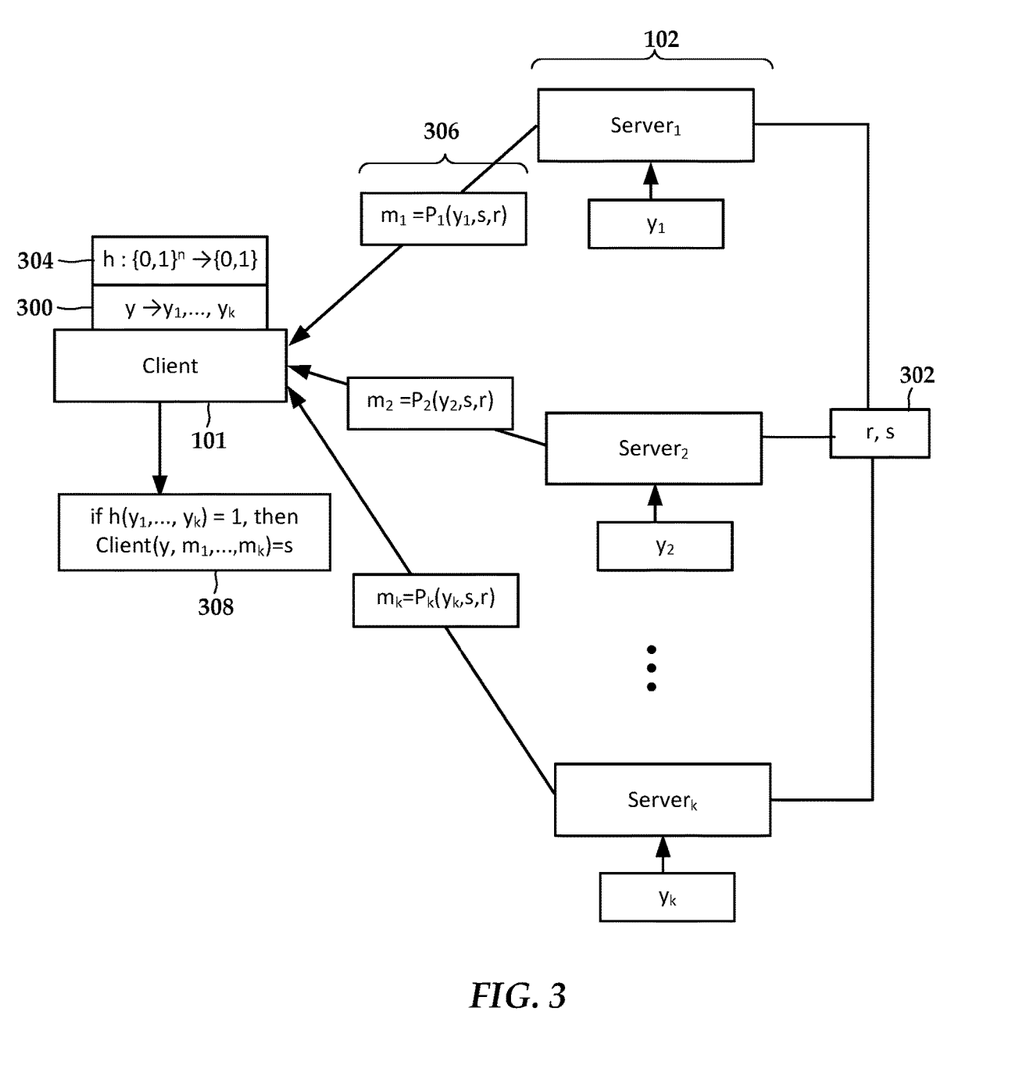
FIG. 3 is a block diagram of a conditional disclosure of secrets system according to an example embodiment.

In FIG. 3 a block diagram illustrates a CDS scheme according to an example embodiment. In this example, the previously described client 101 takes on the role of Carol and the servers 102 take on the role of the k-players. An input 300 y is divided into k-inputs, $y_1, \ldots, y_k$. The client 101 knows these inputs but the servers only know of their own input, e.g., Server$_1$ does not know the values of $y_2, \ldots, y_k$. The servers 102 all have knowledge of shared data 302, which in this case is a shared source of randomness r and a secret s. Note that in some embodiments, only one server 102 may have knowledge of the secret s. The shared source of randomness r may be a family of m-bit random variables, for example.

The client 101 has knowledge of a Boolean condition function 304, $h(y): \{0, 1\}^n \to \{0, 1\}$. Each server 102 constructs a message 306 that is a function of the individual input $y_i$, the shared source of randomness r and the secret s. Note that in embodiments where not all of the servers 102 know the secret, those messages are function of the individual input $y_i$ and the shared source of randomness r. By evaluating the function $h(y_1, \ldots, y_k)$, the client 101 can ascertain whether the secret can be reconstructed, as indicated in block 308.

Figure 4:
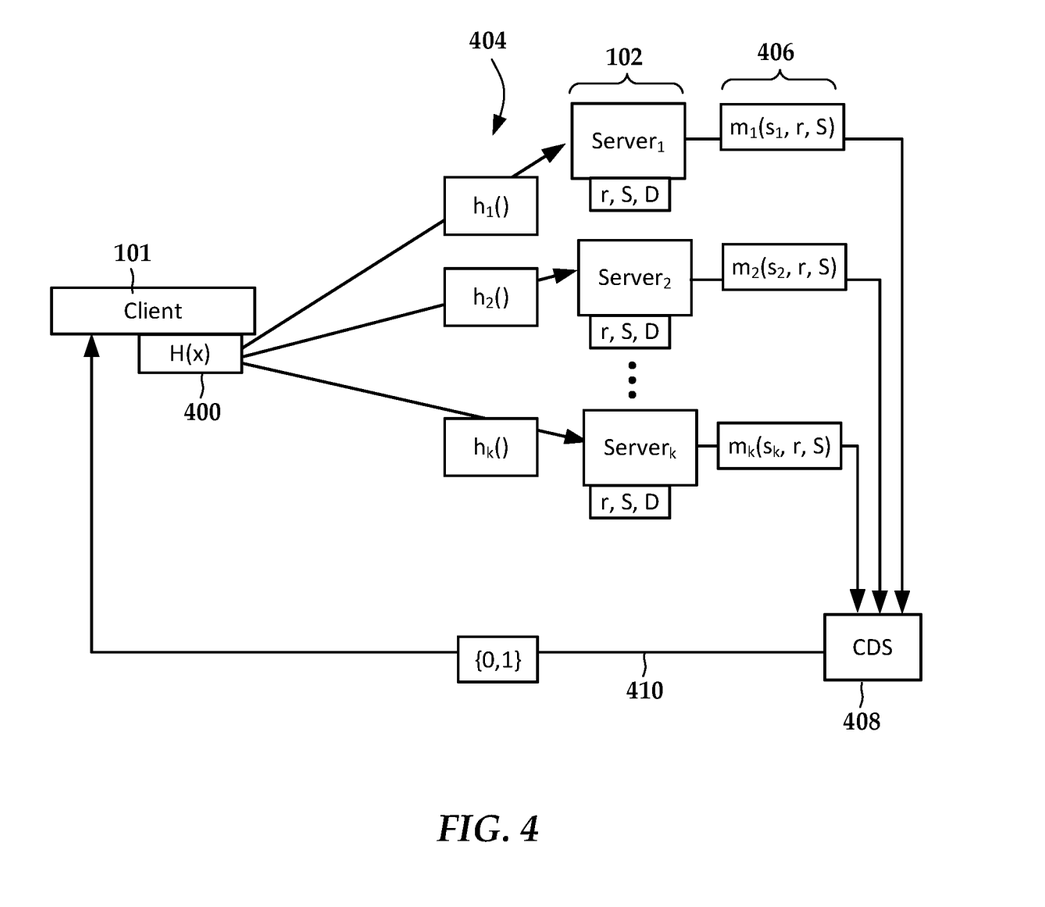
FIGS. 4 and 5 are block diagrams of systems according to an example embodiments.

In FIG. 4, a diagram shows a scheme that uses CDS to construct an FSS scheme according to an example embodiment. This example again uses the aforementioned client 101 and servers 102, however other entities may be involved, as discussed later in this disclosure. The FSS scheme uses a family of functions $\mathcal{H}$ 400 that can be decomposed into fixed Boolean condition function shares 404, defined as h: $\{0, 1\}^n \to \{0, 1\}$. The client 101 in this example is shown as originating the set of function shares 404, which are separately distributed to servers 102. Each server has a copy of a same data set D, and is also shown having access to a shared secret S and shared source of randomness r. The data set D may be, for example, a relational database, and the servers 102 may have access to the same copy, e.g., a network attached drive, a network attached data service, etc. As before, only one server 102 may have knowledge of the secret in some embodiments. Each server 102 applies the function share 104 to its copy of the data set D to obtain a share $s_i$ according the FSS scheme described above.

For the function shares $h_k$, a CDS operation scheme is simulated on the shares $s_k$ calculated using the function shares for $h_k$. For purposes of this disclosure, "simulated" means that the parties perform the operations of the CDS algorithm, however the relationships between the parties need not be as typically involved in CDS (e.g., an independently operating Carol) and the goal of the CDS algorithm need not be to reveal the secret. Each of the k servers 102 in the FSS scheme for h will serve as a player $P_i$. As indicated, a dealer distributes the shared source of randomness r, the secret s, and the information about how any input y is to be divided up among the servers 102. For purposes of this example, the dealer is not shown, however may be an independent entity (e.g., trusted authorization source such as a certificate authority) or may be an intermediary entity involved in the transaction.

To jointly evaluate h on some input y, each party $P_i$ constructs a message $m_i$ 406 according to the CDS scheme for the input y. The parties $P_i$ then come together and simulate the Carol algorithm 408 on their $m_i$ and the input y, which in this case is the share FSS share $s_i$. If the output of the Carol algorithm gives the correct secret s, the parties return 1, otherwise they return 0, as indicated by return value 410. This gives an FSS scheme that is correct with very high probability, has a short key scheme, and (likely) doesn't leak information from any subset of the messages (e.g., if a minimal number of parties is selected for the CDS scheme). Thus, this provides an n-out-of-n FSS scheme for $\mathcal{H}$.

Figure 5:
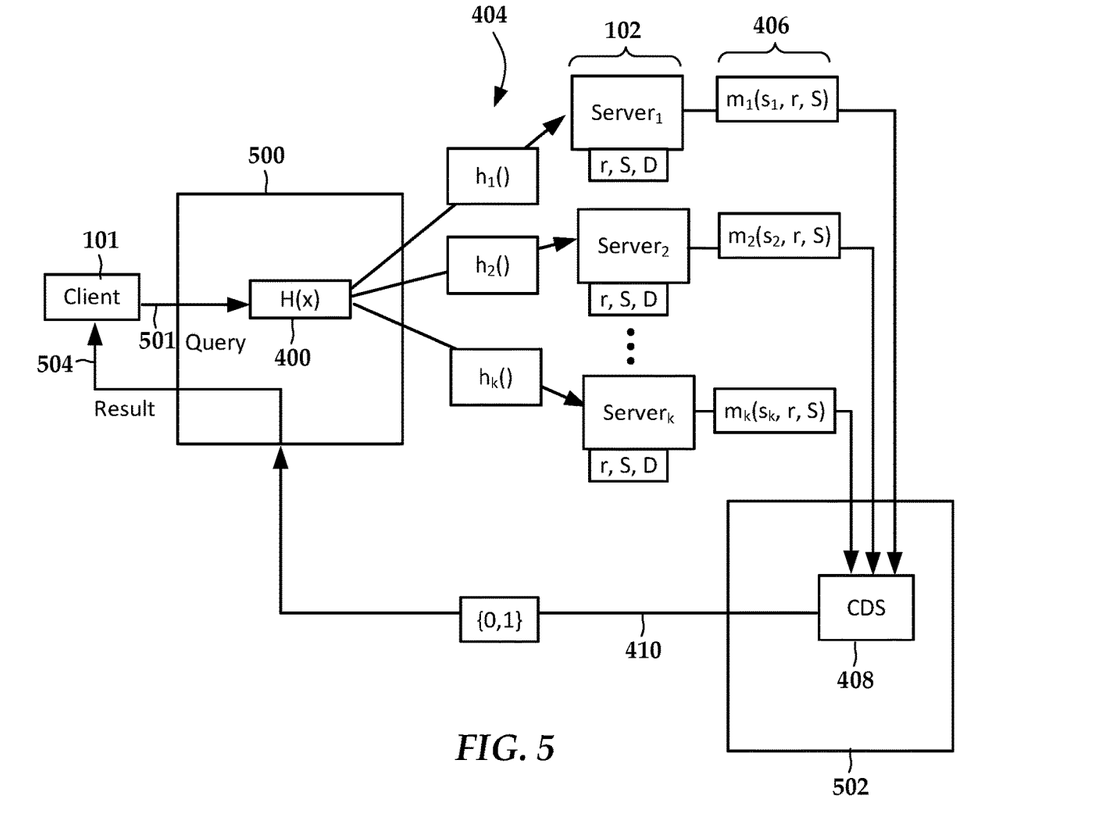

In FIG. 5, a block diagram shows a diagram of a system according to another example embodiment. In this example, the client sends a query 501 to an intermediary node 500, e.g., a server, middleware component, etc. The intermediary determines a function H 400 suitable for the query 501 and decomposes it into function shares 404 as described above. A second intermediary 502 may simulate the CDS operation 408, e.g., the second intermediary 502 may simulate Carol in the CDS scheme. The first intermediary 500 may take the result 410 of the CDS operation and send it to the client 101 as a result 504.

Figure 6:
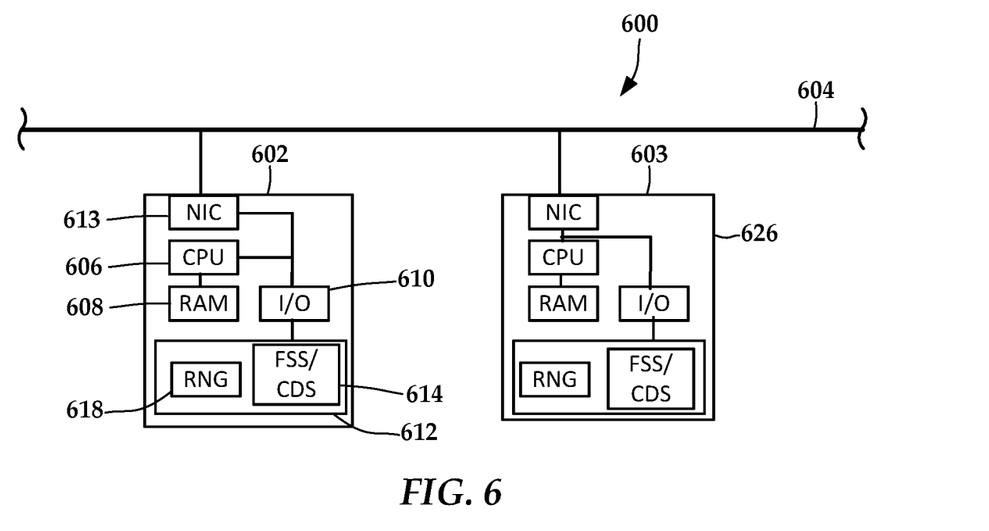
FIG. 6 is a block diagram of system hardware according to an example embodiment.

In FIG. 6, a block diagram shows an example of a system 600 according to an example embodiment. The system 600 is shown with two nodes 602, 603 coupled via a network 604. Generally, the system will include more than two nodes, e.g., at least one node in a client role and two nodes in a server role. The plurality of client and/or server nodes will generally utilize conventional computing hardware, and so any additional nodes may have similar features as the illustrated nodes 602, 603, and specifically as described in relation to node 602.

The conventional computing hardware shown in node 602 may include one or more central processing units (CPUs) 606, volatile memory 608 (e.g., random access memory or RAM), and an input/output (I/O) bus 610. The I/O bus 610 couples the CPU 606 to peripheral devices such as persistent memory 612 (e.g., hard disk drive, solid-state drives) and a network interface (NIC) card 613. The persistent memory 612 stores instructions executable by the processor to perform the operations describe herein. For example, a privacy module 614 may include instructions that perform the FSS and/or CDS operations described herein, depending on whether the node 602 is configured as a client, server, intermediary, etc. Other specialized functions may include a random number generator (RNG) 618 to generate shared randomness for the CDS algorithm and provide random numbers used in FSS. Note an RNG may alternatively be implemented as a hardware device.

Figure 7:
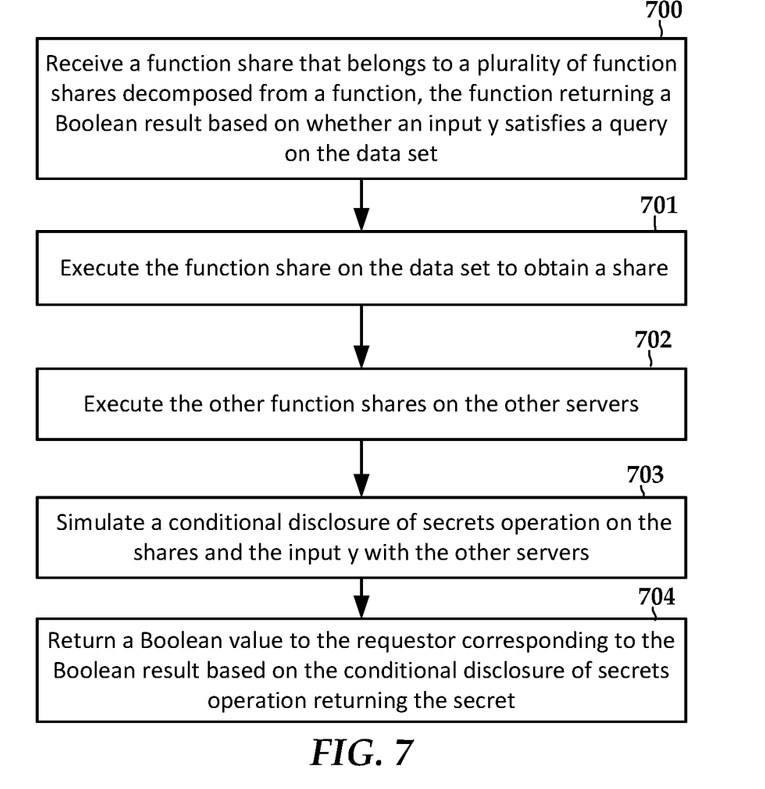
FIGS. 7 and 8 are flowcharts of methods according to example embodiments.

In FIG. 7, a flowchart shows a method according to an example embodiment. The method involves receiving 700, from a requestor at a server selected from a plurality of servers having a same data set, a function share that belongs to a plurality of function shares decomposed from a function. The plurality of function shares are separately distributed by the requestor to the plurality of servers. The function returns a Boolean result based on whether an input y satisfies a query on the data set. The function shares hide the function from non-collaborating entities that separately execute the function shares.

The function share is executed 701 on the data set to obtain a share. The others of the servers execute 702 the other function shares to obtaining other shares. With the other servers, a conditional disclosure of secrets operation is simulated 703 on the shares and the input y. The conditional disclosure of secrets operation uses a secret known to at least one of the plurality of servers, and further uses a source of randomness shared between the plurality of servers. A Boolean value is returned 704 to the requestor corresponding to the Boolean result based on the conditional disclosure of secrets operation returning the secret.

Figure 8:
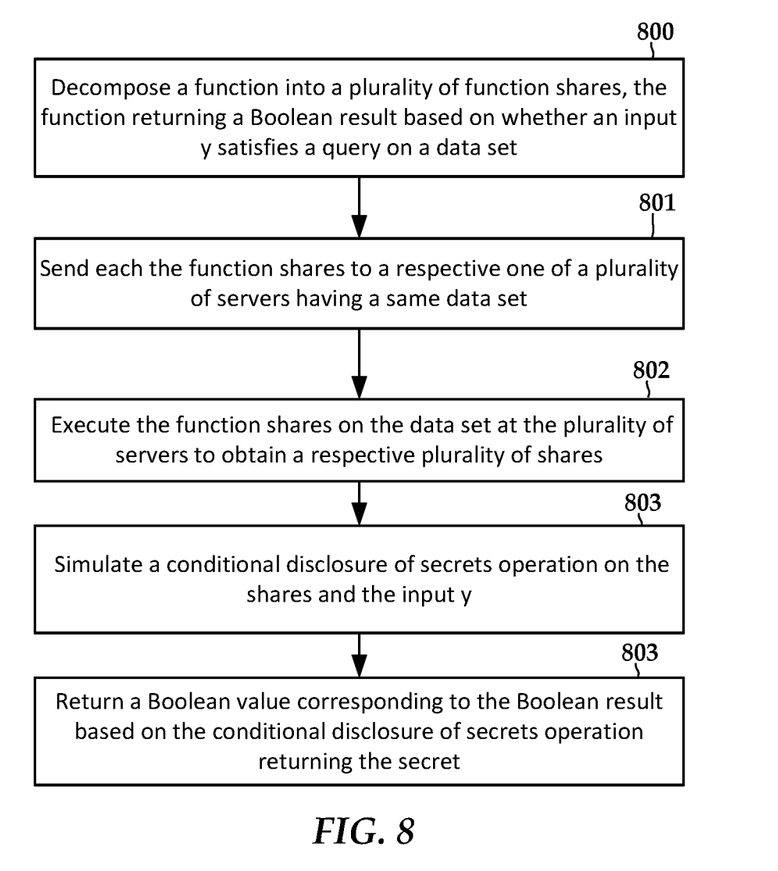

In FIG. 8, a flowchart shows a method according to another example embodiment. The method involves decomposing 800 a function share into a plurality of function shares. The function returning a Boolean result based on whether an input y satisfies a query on a data set. The function shares hide the function from non-collaborating entities that separately execute the function shares. Each of the function shares is sent 801 to a respective one of a plurality of servers having a same data set. The function shares are executed 802 on the data set at the plurality of servers to obtain a respective plurality of shares. A conditional disclosure of secrets operation is simulated 803 on the shares and the input y. The conditional disclosure of secrets operation uses a secret known to at least one of the plurality of servers, and further uses a source of randomness shared between the plurality of servers. A Boolean value is returned 804 corresponding to the Boolean result based on the conditional disclosure of secrets operation returning the secret. For example, if the secret is not returned, the Boolean result is false, and if the secret is returned, the Boolean result is true. The inverse could be used as well.

A more formal development of an oblivious CDS scheme is now described. We define an oblivious conditional disclosure of secrets scheme as follows. Let h: $\{0, 1\}^n$ be a Boolean condition function that lies in a family of Boolean condition functions $\mathcal{H}$. Partition [n] into k sets $B_1, B_2, \ldots, B_k$ (where $B_j$ is the $j^{th}$ player's portion of the input), and let S be the secret domain. An oblivious CDS scheme for h given secret domain S and partition of [n] into $B_1, B_2, \ldots, B_k$ comprises a set of k players $P_1, \ldots, P_k$ and an external third party Carol, where the protocol proceeds as follows. Let $r_j$ be a share for player $p_j$ generated by some randomized algorithm that takes in randomness r. For fixed input $y \in \{0, 1\}^n$ where $y = y_1, y_2 \ldots y_n$, secret $s \in S$, and $1 \le j \le k$, each player $P_j$ sends some message $m_j$ to Carol where $mm = P_j(y|B_j, s, r_j)$ is some player-specific function of their portion of the input, their randomness, and the secret. Here, $y|B_j$ is the bits of y that lie in the partition $B_1$. Each $m_i$ is a random variable over the choice of $r_j \sim R_j$.

An oblivious CDS scheme satisfies three conditions. The first condition is correctness: for every $y \in \{0, 1\}^n$, if $h(y)=1$ (that is, if the condition holds on the input y), then for all s and $r_j$, Carol($m_1, m_2, \ldots, m_k$)=s, meaning that Carol correctly reconstructs the secrets with probability 1 from only the player's messages. If $h(y)=0$, then Carol rejects with probability 1. The second condition is secret security: choose any $y \in \{0, 1\}^n$. Then for any pair of secrets $s_0, s_1 \in S$, the two k-tuples of random message variables $\langle m_j^{s_0} \rangle$ and $\langle m_j^{s_1} \rangle$ generated by each secret are identically distributed over the choice of r, the random input that generates the $r_j$s. In essence, this condition ensures that if $h(y)=0$, Carol cannot gain any information about the actual secret, since the messages she sees from the players are identically distributed.

The third condition is function security: for any choice of player $P_j$, given $y|B_j$, s, and $r_j$, it is computationally hard for $P_j$ to determine $h \in \mathcal{H}$. For Carol, given the tuple of messages $\langle m_j \rangle$, she gains a negligible advantage in determining $h \in \mathcal{H}$ as opposed to any other $h' \in \mathcal{H}$ such that $h'(y)=h(y)$ (as $h(y)$ is the information revealed about h from the evaluation).

For example, take $\mathcal{H}_p$ to be the family of Boolean point functions on $\{0, 1\}^n \times \{0, 1\}^n$; that is, for $h_{(a,b)} \in \mathcal{H}_p$, where $(a, b) \in \{0, 1\}^n \times \{0, 1\}^n$, $h_{(a,b)}((a, b))=1$ and $h_{(a,b)}((x, y))=0$ for $(x, y) \neq (a, b)$. Let $n=p^k$. Suppose $\mathcal{S} = \mathcal{I} \subseteq \mathbb{F}_{p^k} \times \mathbb{F}_{p^k}$ where $\mathcal{I}$ is the set of pairs of inverses in $\mathbb{F}_{p^k}$. We demonstrate an oblivious CDS scheme for condition functions $\mathcal{H}_p$ and secret domain S for two parties, which we will call Alice and Bob.

Given $h_{(a,b)} \in \mathcal{H}_p$ and a secret $s=(s_1, s_2) \in \mathcal{S}$, construct a bivariate polynomial p(x, y) that factors into two high-degree univariate polynomials such that $p(x, y)=f(x)g(y)$. Furthermore, let $p(a, b) \neq 1$ and $p(a, b)=1$ for $(x, y) \neq (a, b)$, and finally let $f(a)=s_1$ and $g(b)=s_2$. Then, Alice receives $(s_1, s_2)$, $f(x)$, and some input $a' \in \{0, 1\}^n$, while Bob receives $(s_1, s_2)$, $g(y)$, and some input $b' \in \{0, 1\}^n$. Then, Alice and Bob send $f(a')$ and $g(b')$ respectively to Carol, who then multiplies the two together and returns (f (a'), g(b')) if the product is 1 and rejects otherwise.

As for correctness, since $f(a')g(b')=p(a', b')$ can only be 1 when $a'=a$ and $b'=b$, Carol outputs a tuple if and only if she receives (and outputs) $(f(a), g(b))=(s_1, s_2)$. For security, Alice can figure out a from f(a) and f(x) by polynomial factoring (and similarly Bob can figure out b), but it is computationally hard for Alice to figure out b (and for Bob to figure out a) even when Alice receives a and Bob receives b. Similarly, Carol gains no advantage in determining p(x, y) or $h_{(a,b)}$ from the receipt of (f (a'), g(b')) even when $a'=a$ or $b'=b$ (or both).

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method, comprising:
    receiving, from a requestor at a server selected from a plurality of servers having a same data set, a function share that belongs to a plurality of function shares decomposed from a function, the plurality of function shares separately distributed by the requestor to the plurality of servers, the function returning a Boolean result based on whether an input y satisfies a query on the data set, the function shares hiding the function from non-collaborating entities that separately execute the function shares;
    executing the function share on the data set to obtain a share, others of the plurality of servers obtaining other shares based on executing the other function shares;
    with the other servers, simulating a conditional disclosure of secrets operation on the shares and the input y, the conditional disclosure of secrets operation using a secret known to at least one of the plurality of servers, and further using a source of randomness shared between the plurality of servers; and
    returning a Boolean value to the requestor corresponding to the Boolean result based on the conditional disclosure of secrets operation returning the secret.

2. The method of claim 1, wherein the requestor comprises an intermediary server between a client and the plurality of servers, the requestor decomposing the query by the client into the plurality of function shares.

3. The method of claim 2, wherein the intermediary server performs the conditional disclosure of secrets operation.

4. The method of claim 1, wherein the shared source of randomness comprises a family of n-bit random values.

5. The method of claim 1, wherein the secret is known by all of the plurality of servers.

6. The method of claim 1, wherein the simulating of the conditional disclosure of secrets prevents leakage of other data from the data set that is not a subject of the query.

7. The method of claim 1, wherein the function shares hide the function from the plurality of servers so long as at least one of the servers does not collaborate with the rest of the plurality of servers.

8. The method of claim 1, wherein the data set comprises a relational database.

9. An apparatus comprising a processor and memory, the memory comprising instructions operable by the processor to perform the method of claim 1.

10. A method, comprising:
    decomposing a function into a plurality of function shares, the function returning a Boolean result based on whether an input y satisfies a query on a data set, the function shares hiding the function from non-collaborating entities that separately execute the function shares;
    sending each the function shares to a respective one of a plurality of servers having a same data set;
    executing the function shares on the data set at the plurality of servers to obtain a respective plurality of shares;
    simulating a conditional disclosure of secrets operation on the shares and the input y, the conditional disclosure of secrets operation using a secret known to at least one of the plurality of servers, and further using a source of randomness shared between the plurality of servers; and
    returning a Boolean value corresponding to the Boolean result based on the conditional disclosure of secrets operation returning the secret.

11. The method of claim 10, wherein the query originates from an intermediary server between a client and the plurality of servers, the intermediary server decomposing the query by the client into the plurality of function shares.

12. The method of claim 11, wherein the intermediary server performs the conditional disclosure of secrets operation.

13. The method of claim 10, wherein the shared source of randomness comprises a family of a-bit random values.

14. The method of claim 10, wherein the secret is known by all of the plurality of servers.

15. The method of claim 10, wherein the simulating of the conditional disclosure of secrets prevents leakage of other data from the data set that is not a subject of the query.

16. The method of claim 10, wherein the function shares hide the function from the plurality of servers so long as at least one of the servers does not collaborate with the rest of the plurality of servers.

17. The method of claim 10, wherein the data set comprises a relational database.

18. A system comprising:
    a plurality of servers each having access to a same data set; and
    a computing entity coupled via a network to the plurality of servers and operable to:
        decompose a function into a plurality of function shares, the function returning a Boolean result based on whether an input y satisfies a query on a data set, the function shares hiding the function from non-collaborating entities that separately execute the function shares; and
        send each the function shares to a respective one of the plurality of servers;

wherein the plurality of servers are operable to:
  receive and execute the function shares on the data set to obtain a respective plurality of shares;
  simulate a conditional disclosure of secrets operation on the shares and the input y, the conditional disclosure of secrets operation using a secret known to at least one of the plurality of servers, and further using a source of randomness shared between the plurality of servers; and
  return a Boolean value corresponding to the Boolean result based on the conditional disclosure of secrets operation returning the secret.

19. The system of claim 18, wherein the simulating of the conditional disclosure of secrets prevents leakage of other data from the data set that is not a subject of the query.

20. The system of claim 18, wherein the function shares hide the function from the plurality of servers so long as at least one of the servers does not collaborate with the rest of the plurality of servers.

* * * * *